US012809688B2

(12) United States Patent
Pinho et al.

(10) Patent No.: US 12,809,688 B2
(45) Date of Patent: Nov. 24, 2026

(54) DYNAMIC ORCHESTRATION OF QUADRATIC UNCONSTRAINED BINARY OPTIMIZATION COMPILATION AND EXECUTION

(71) Applicant: Dell Products L.P., Round Rock, TX (US)

(72) Inventors: Rômulo Teixeira de Abreu Pinho, Niterói (BR); Brendan Burns Healy, Haddonfield, NJ (US); Miguel Paredes Quiñones, Campinas (BR); Victor Fong, Medford, MA (US)

(73) Assignee: Dell Products L.P., Round Rock, TX (US)

(*) Notice: Subject to any disclaimer, the term of this patent is extended or adjusted under 35 U.S.C. 154(b) by 516 days.

(21) Appl. No.: 18/321,230

(22) Filed: May 22, 2023

(65) Prior Publication Data

US 2024/0394326 A1 Nov. 28, 2024

(51) Int. Cl.
*G06F 9/50* (2006.01)
*G06N 10/80* (2022.01)

(52) U.S. Cl.
CPC ...... *G06F 9/5066* (2013.01); *G06F 2209/501* (2013.01); *G06F 2209/5017* (2013.01); *G06F 2209/503* (2013.01); *G06F 2209/506* (2013.01); *G06N 10/80* (2022.01)

(58) Field of Classification Search
CPC ............. G06F 9/5066; G06F 2209/501; G06F 2209/5017; G06F 2209/503; G06F 2209/506; G06F 17/11; G06N 10/80; G06N 20/00; G06N 10/60
See application file for complete search history.

(56) References Cited

U.S. PATENT DOCUMENTS 10,223,084 B1 * 3/2019 Dunn ........................ G06F 8/41
10,817,337 B1 10/2020 Richardson et al.
11,280,826 B2 3/2022 He et al.
11,527,323 B2 12/2022 Michuda et al.
11,574,030 B1 * 2/2023 Harrigan ................ G06N 10/20
11,907,092 B2 2/2024 Krneta et al.
12,447,617 B1 10/2025 Schuetz et al.
(Continued)

FOREIGN PATENT DOCUMENTS

CA 2997970 A1 10/2018
WO 2023/018599 A1 2/2023

OTHER PUBLICATIONS

Sheir Yarkoni et al, Quantum Annealing for Industry Applications, 2022 Reports on Progress in Physics 85 104001DOI 10.1088/1361-6633/ac8c54.

(Continued)

*Primary Examiner* — Aimee Li
*Assistant Examiner* — Andrew Sun
(74) *Attorney, Agent, or Firm* — Workman Nydegger

(57) ABSTRACT

An orchestration is configured to identify a compilation job and an annealing job of a quantum job. The compilation job and the annealing job may be orchestrated based on estimated costs, resources availability, and service level objectives. The compilation job and the annealing job may be orchestrated in the context of orchestrating multiple quantum jobs. The orchestration engine may orchestrate the compilation and annealing jobs in the same or different systems.

20 Claims, 5 Drawing Sheets

(56) References Cited

U.S. PATENT DOCUMENTS

| | | | | |
|---|---|---|---|---|
| 2011/0238378 | A1* | 9/2011 | Allen | B82Y 10/00 702/186 |
| 2014/0250288 | A1 | 9/2014 | Roy | |
| 2016/0057629 | A1 | 2/2016 | Dong et al. | |
| 2018/0308000 | A1 | 10/2018 | Dukatz et al. | |
| 2019/0205790 | A1 | 7/2019 | Dukatz et al. | |
| 2020/0012948 | A1 | 1/2020 | Tian et al. | |
| 2020/0057957 | A1* | 2/2020 | Johnson | G02F 1/01791 |
| 2020/0118025 | A1* | 4/2020 | Romero | G06N 3/0475 |
| 2020/0272625 | A1 | 8/2020 | Brumby et al. | |
| 2020/0401565 | A1* | 12/2020 | Saillet | G06F 16/24578 |
| 2021/0097419 | A1 | 4/2021 | Limberg et al. | |
| 2021/0281592 | A1 | 9/2021 | Givental et al. | |
| 2021/0286328 | A1 | 9/2021 | Yoneoka | |
| 2021/0357797 | A1* | 11/2021 | Karalekas | G06N 10/40 |
| 2022/0261688 | A1 | 8/2022 | Nimavat et al. | |
| 2022/0327479 | A1 | 10/2022 | Suguiura et al. | |
| 2023/0044102 | A1 | 2/2023 | Anderson et al. | |
| 2023/0047230 | A1 | 2/2023 | Roque et al. | |
| 2023/0047692 | A1 | 2/2023 | Roque et al. | |
| 2023/0048306 | A1 | 2/2023 | Roque et al. | |
| 2023/0069537 | A1 | 3/2023 | Allybokus et al. | |
| 2023/0325461 | A1 | 10/2023 | Dudash et al. | |
| 2023/0359922 | A1* | 11/2023 | Klimov | G06N 10/60 |
| 2024/0013048 | A1 | 1/2024 | Deshpande et al. | |
| 2024/0160687 | A1 | 5/2024 | Vollath et al. | |
| 2024/0330738 | A1* | 10/2024 | Shi | G06N 10/20 |
| 2024/0354369 | A1 | 10/2024 | Bowles et al. | |

OTHER PUBLICATIONS

Olivier Goldschmidt et al, Polynomial Algorithm for the k-Cut Problem, 29th Annual Symposium on Foundations of Computer Science, Oct. 1988.

Gili Rosenberg, Mohammad Vazifeh, Brad Woods, Eldad Haber, Building an iterative heuristic solver for a quantum annealer, 2015, https://arxiv.org/abs/1507.07605.

Denchev et al., What is the Computational Value of Finite-Range Tunneling?, Aug. 1, 2016, Physical Review X, 1-19, 6 / 031015.

Fixstars Amplify SDK; https://amplify.fixstars.com/en/sdk; accessed as early as May 2023.

Hybrid Solvers—Ocean Documentation 8.1.0; https://docs.ocean.dwavesys.com/en/stable/overview/hybrid.html; accessed Jan. 9, 2025.

Uchehara, et al., Quantum Circuit Cutting https://pennylane.ai/qml/demos/tutorial_quantum_circuit_cutting; Sep. 1, 2022.

Abohashima et al., (Classification with Quantum Machine Learning: A Survey) Jun. 22, 2020 (Year: 2020).

Huang et al., "Benchmarking Quantum (-Inspired) Annealing Hardware on Practical Use Cases", Nov. 3, 2022, IEEE Transactions on Computers, vol. 72, No. 6, pp. 1692-1705. (Year: 2022).

Barbosa et al. "Using Machine Learning for Quantum Annealing Accuracy Prediction" (Year: 2021).

Gujarati et al. "Swayam: Distributed Autoscaling to Meet SLAs of Machine Learning Inference Services with Resource Efficiency" (Year: 2017).

* cited by examiner

DYNAMIC ORCHESTRATION OF QUADRATIC UNCONSTRAINED BINARY OPTIMIZATION COMPILATION AND EXECUTION

FIELD OF THE INVENTION

Embodiments of the present invention generally relate to quantum processing systems and to quantum-related operations. More particularly, at least some embodiments of the invention relate to systems, hardware, software, computer-readable media, and methods for orchestrating the compilation and/or execution of quantum jobs in classical, hybrid, and/or quantum processing systems.

BACKGROUND

A quantum annealer is a type of quantum computing system that is often used to execute difficult and complicated optimization/combinatorial problems. Optimization problems often have a large number of solutions and quantum annealers allow an optimal or most likely solution to be discovered more quickly compared to solving the optimization problem in classical computing systems. Even though quantum systems are more efficient in various circumstances compared to classical computing systems, generating solutions for various types of optimization problems still require a significant amount of time and it is desirable to improve the efficiencies of the various operations required to fully execute a quantum job.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
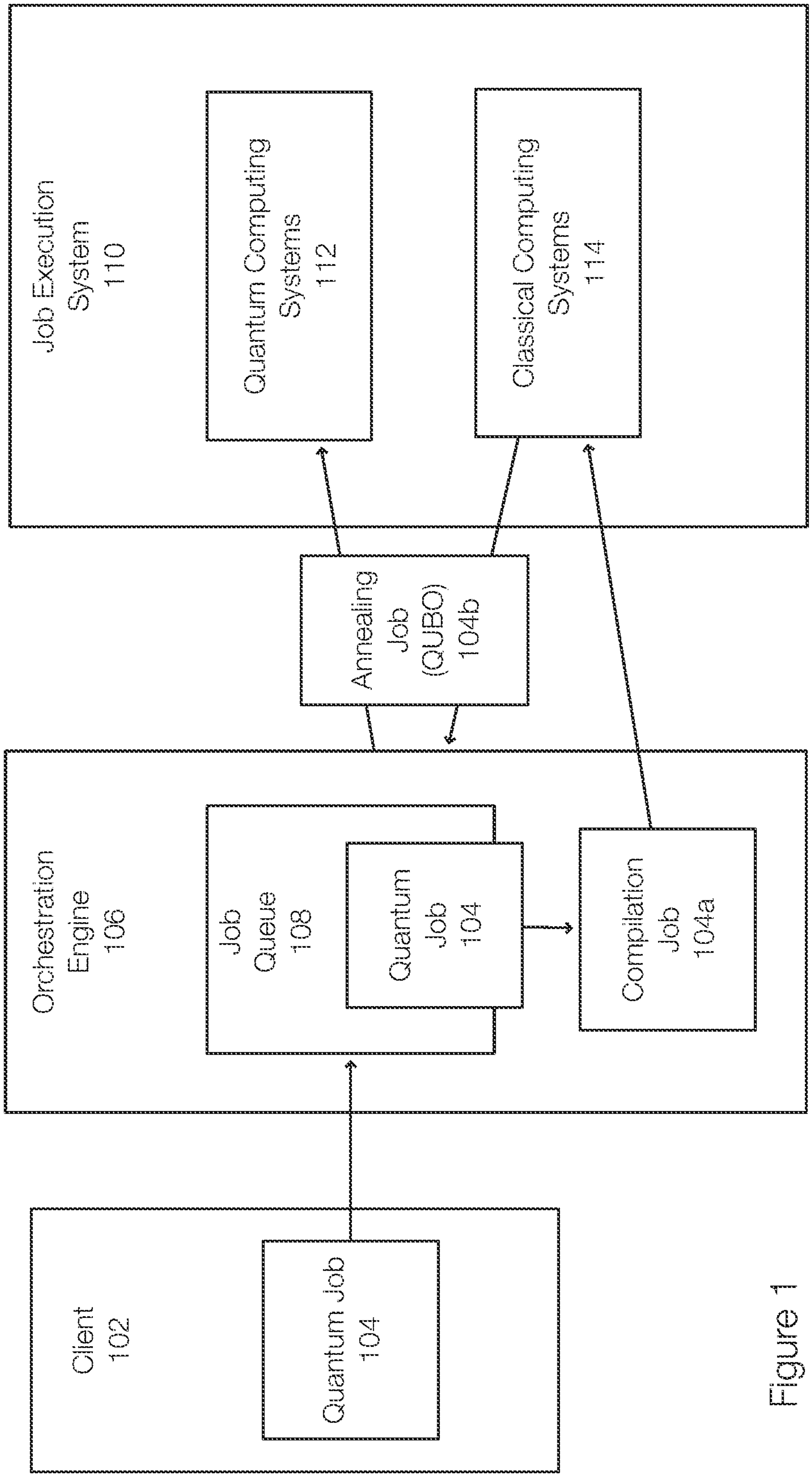
FIG. 1 discloses aspects of an orchestration engine configured to perform operations related to executing quantum jobs.

Embodiments of the present invention generally relate to executing quantum jobs. More particularly, at least some embodiments of the invention relate to systems, hardware, software, computer-readable media, and methods for accelerating and/or performing quantum unconstrained binary optimization (QUBO) problems. When a problem such as an optimization problem is expressed in QUBO form, a quantum processing unit or system, such as a quantum annealer, can find a solution to the QUBO. A QUBO can be expressed in different manners including as a matrix, as a file that contains the terms of the QUBO, algebraically, or the like.

QUBOs can be generated for a variety of different optimization problems related to, for example, ticket prices, risk assessment, supply chains, last mile delivery, portfolio management, and the like. Other areas in which QUBOs may be useful include finance, machine learning, economics, distribution, or the like. Although embodiments of the invention are discussed with reference to QUBOs, embodiments of the invention are not limited thereto.

For example, a common type of optimization problem relates to logistics. A business, for example, may want to deliver product from a source to a target. There are many different potential routes that could be followed to deliver the product and each route may have certain characteristics or combinations of characteristics. The characteristics may include delivery time, road or route type, average vehicle speed, fuel cost, or the like. The goal or optimal solution of this problem may be to identify the route that minimizes driving time and fuel costs while maximizing the number of deliveries.

Thus, one goal of solving an optimization problem is to find an optimal solution from among a potentially large set of solutions. Once a problem is expressed in a particular form, such as in QUBO form, quantum annealers are often able to find the optimal solution more quickly than classical computing systems.

Example embodiments of the invention relate to QUBO problems and quantum annealing (QA). A QUBO problem can generally be encoded in the following format or represented as follows:

$$H(x) = \sum_{i<j} q_{i,j} x_i x_j + \sum_i q_i x_i^2 = x^T Q x,$$

where $x \in \{0,1\}^n$.

A problem, such as an optimization or combinatorial problem, can be expressed in QUBO form. The process of converting the combinatorial problem into QUBO form, however, can be time consuming. If the combinatorial problem is viewed as a quantum job, generating the QUBO form from the combinatorial problem is an example of compiling the quantum job to generate a compiled output. The compiled output can be provided as input to a quantum annealer and executed.

A combinatorial problem can be solved or expressed using binary variables. Thus, the mathematical expression of the combinatorial problem includes binary variables. For example, a general QUBO for two binary variables x and y is:

$$QUBO = Ax^2 + Bxy + Cy^2 + Dx + Ey + F.$$

As the number of variables increases, the number of terms of the QUBO may also increase. However, this may be represented by combining the quadratic terms with the linear terms because the variables are binary in nature (thus $x^2 = x$ if x is 0 or 1).

A QUBO is generally unconstrained. To impose constraints, a QUBO can include a penalty or allow certain solutions to be penalized. This is a way to introduce constraints that eliminate solutions that may be undesirable.

In one example, an optimization problem is often expressed as a Hamiltonian. An objective function $H_{objective}$ may be expressed as a sum of terms that represent interactions or energies. The objective function may describe the energy of a quantum system that is being optimized or minimized. Constraints can be added to the objective function such that:

$$H_{final} = H_{objective} + \sum_i \lambda_i \cdot H_i.$$

In this example, $H_{final}$ is the QUBO Hamiltonian that is provided to a quantum system such as a quantum annealer and $H_{objective}$ is the Hamiltonian to be minimized. $H_i$ is the $i^{th}$ Hamiltonian corresponding to the dualization of constraint i (i.e., linear equality) with penalty $\lambda_i$. The creation of $H_i$ implies matrix multiplications.

Thus, preparing the QUBO (e.g., generating $H_{final}$) is an example of compiling a quantum job. The output of compilation may be a file that provided as input to the quantum system and includes specifications of how a QUBO matrix should be filled. Executing the QUBO is an example of executing or performing the quantum job.

PyQUBO is a python library (or script) that allows users to define binary variables, constraints, and objective functions. The script may generate a QUBO (or Ising formulation) that can be provided as input to a quantum annealer.

FIG. 1 discloses aspects of an orchestration engine configured to orchestrate quantum jobs. As discussed herein, a quantum job may be executed by executing or performing smaller jobs that are part of the larger quantum job. For example, part of executing a quantum job includes performing a compiling job or generating a QUBO. Another part of the quantum job is executing the QUBO at a quantum computing system.

Thus, orchestrating a quantum job requires the at least compilation and execution jobs to be performed. The compilation is typically performed on classical computing systems (processors (CPU, GPU), memory, other computing hardware). Execution may be performed on quantum systems, which may be simulated in classical computing systems or performed in real quantum systems.

Embodiments of the invention are discussed with respect to quantum annealers. A quantum annealer includes quantum hardware that is configured to find a global minimum of an objective function. A quantum annealer, for example, may try to find a lowest-energy state of a system, which represents a solution to the optimization problem.

In one example, a quantum annealer may be prepared in a high-energy state and allowed to execute a QUBO (e.g., a Hamiltonian). A Hamiltonian is configured to describe interactions among the components or parts of a given system. During execution of a QUBO, the QUBO may be converted to a graph form and mapped to qubits of a quantum annealer. The quantum annealer is programmed and initialized. The quantum annealer then executes to generate an output or solution to the optimization problem.

When the quantum job 104 is received by the orchestration engine 106, the quantum job 104 may be placed in a job queue 108. The orchestration engine 106 is configured to orchestrate at least the compilation and execution of the quantum jobs in the job queue 108. The orchestration engine 106 may interact with a job execution system 110 by placing the compilation portion of the quantum job 104 to a computing system and by placing the execution portion of the quantum job 104 to a quantum system in the job execution system 110. More specifically, performing or orchestrating the quantum job by the orchestration engine 106 may include orchestrating aspects of the job 104 including compiling the quantum job and executing the quantum job.

The job execution system 110 may include quantum computing systems 112 such as quantum annealers (real, digital, and/or simulated) and classical computing systems 114. The orchestration engine 106 retrieves a quantum job from the job queue 108 and evaluates the quantum job 104 to identify a compilation job 104*a* of the quantum job 104. The orchestration engine 106 may direct or place the compilation job 104*a* to the classical computing systems 114.

The classical computing systems 114 may output a file (e.g., a QUBO or annealing job 104*b*) that is received by the orchestration engine 106. The orchestration engine 106 then orchestrates execution of the annealing job (QUBO) 104*b* by directing the QUBO 104*b* to the quantum computing systems 112.

Figure 2:
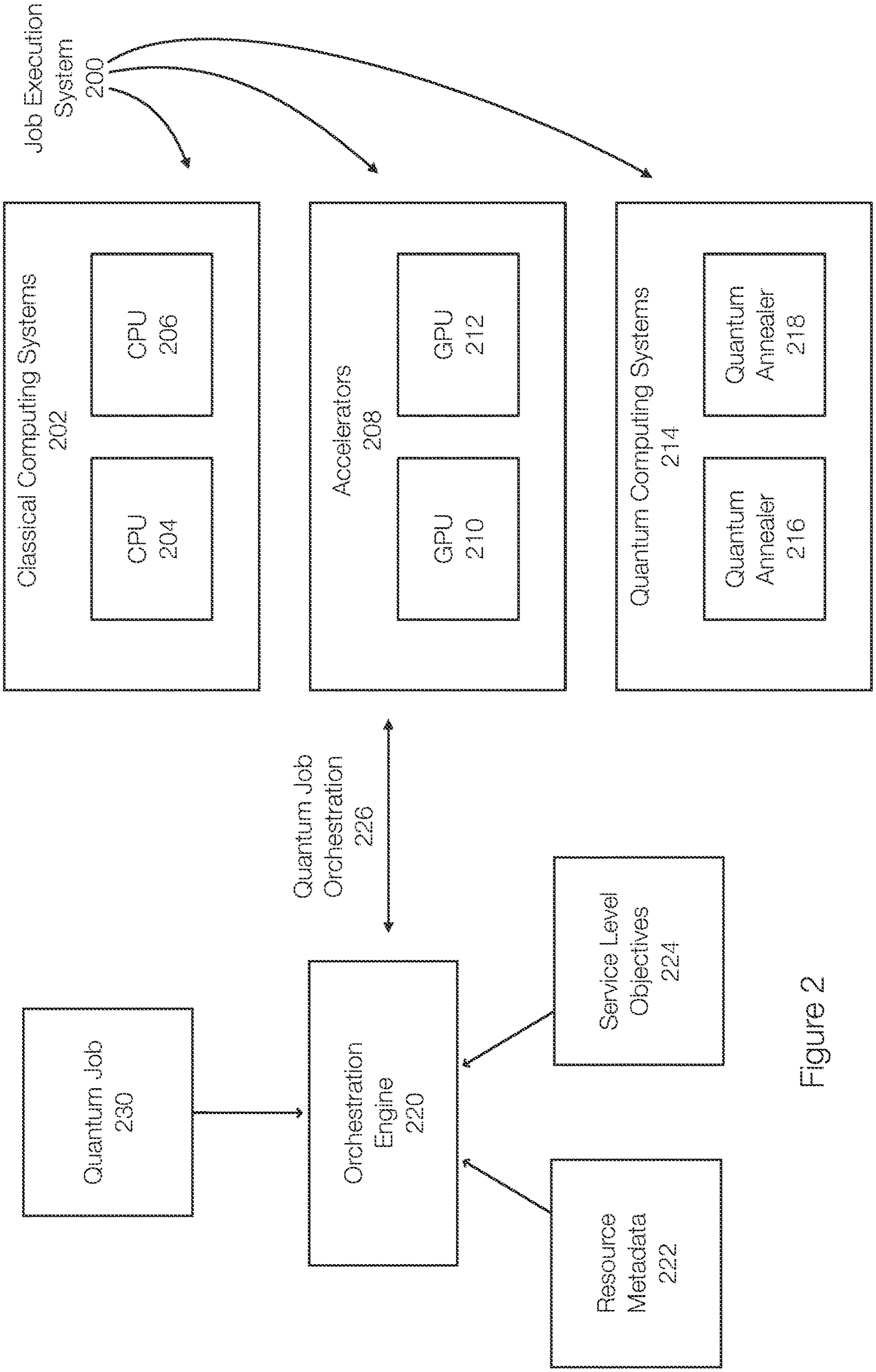
FIG. 2 discloses aspects of orchestrating quantum jobs based on resource availability and/or service level objectives.

FIG. 2 discloses aspects of orchestrating quantum jobs in a job execution system. The job execution system 200 may include classical computing systems 202 represented by CPUs (Central Processing Units) 204 and 206. The classical computing systems 202 thus typically include processors, memory, networking hardware, or the like. The job execution system 200 may also include accelerators 208, represented by GPUs (graphical processing units) 210 and 212. The job execution system 200 may also include quantum computing systems represented by quantum annealers 216 and 218.

The job execution system 200 may include systems associated with different providers. Further, some of the systems in the job execution system 200 may be hybrid computing systems that include classical and quantum aspects. In one example, the classical computing systems 202 and the accelerators 208 may be represented by nodes or servers (real, virtual, container). Each of these nodes has resources that are being used and resources that are available for use by another process or operation. The quantum computing systems 214 may similarly be associated with resource in use/available.

The orchestration engine 220 has access to resource metadata 222 and service level objectives 224. The resource metadata 222 and/or the service level objectives 224 allow the orchestration engine 220 to know which of the various computing systems (nodes) in the job execution system 200 are busy and which have available resources. This allows the orchestration engine 220 to distribute the quantum job 230 (or portions thereof) to specific systems or specific nodes. For example, the orchestration engine 220 may perform quantum job orchestration on the quantum job 230 by distributing a compilation job or portion of the quantum job 230 to the GPU 210 and distributing the annealing job or portion of the quantum job 230 to the quantum annealer 216 based on the resource metadata 222 and/or the service level objectives 224.

More specifically, the resource metadata 222, which may be regularly updated, may indicate that the CPU 206 has 50% of its resources available and that the quantum annealer 216 is associated with an average execution time. If the quantum job 230 requires a certain total completion time (e.g., compilation and execution), the compilation job may be sent to the CPU 206 and the annealing job may be sent to the quantum annealer 216 based on the resource metadata 222 and/or the service level objectives 224. Alternatively, if total completion time is not a priority, the execution portion could be sent to a slower or less expensive quantum annealer. The resource metadata 222 and/or the service level objectives 224 allows the orchestration engine 220 to distribute complication jobs and annealing jobs to systems that have the resources and/or the availability and that can satisfy any relevant service objectives.

Further, some of the classical computing systems 202 and/or accelerators 208 may be used as or include virtual or simulated quantum annealers. The orchestration engine 220 can orchestrate the compilation of multiple quantum jobs such that CPU and GPU can be used efficiently for both compilation jobs and annealing jobs (execution).

Because compilation is generally performed solely on classical computing systems (CPU and/or GPU) and because compilation time can be large (depending on the size of the problem), the ability to orchestrate the compilation and/or execution of the quantum jobs within the job execution system 200 cam improve the efficiencies of providing/generating solutions to the quantum jobs. The resources in the job execution system 200 can be allocated such that resources are efficiently used and such that the quantum jobs in the job queue are performed efficiently and timely.

To efficiently use the resources, the orchestration engine 220 thus used the resource metadata 222 and the service level objectives 224 to perform tasks that include both placing and monitoring compilation jobs and annealing jobs within the job execution system 200.

Figure 3:
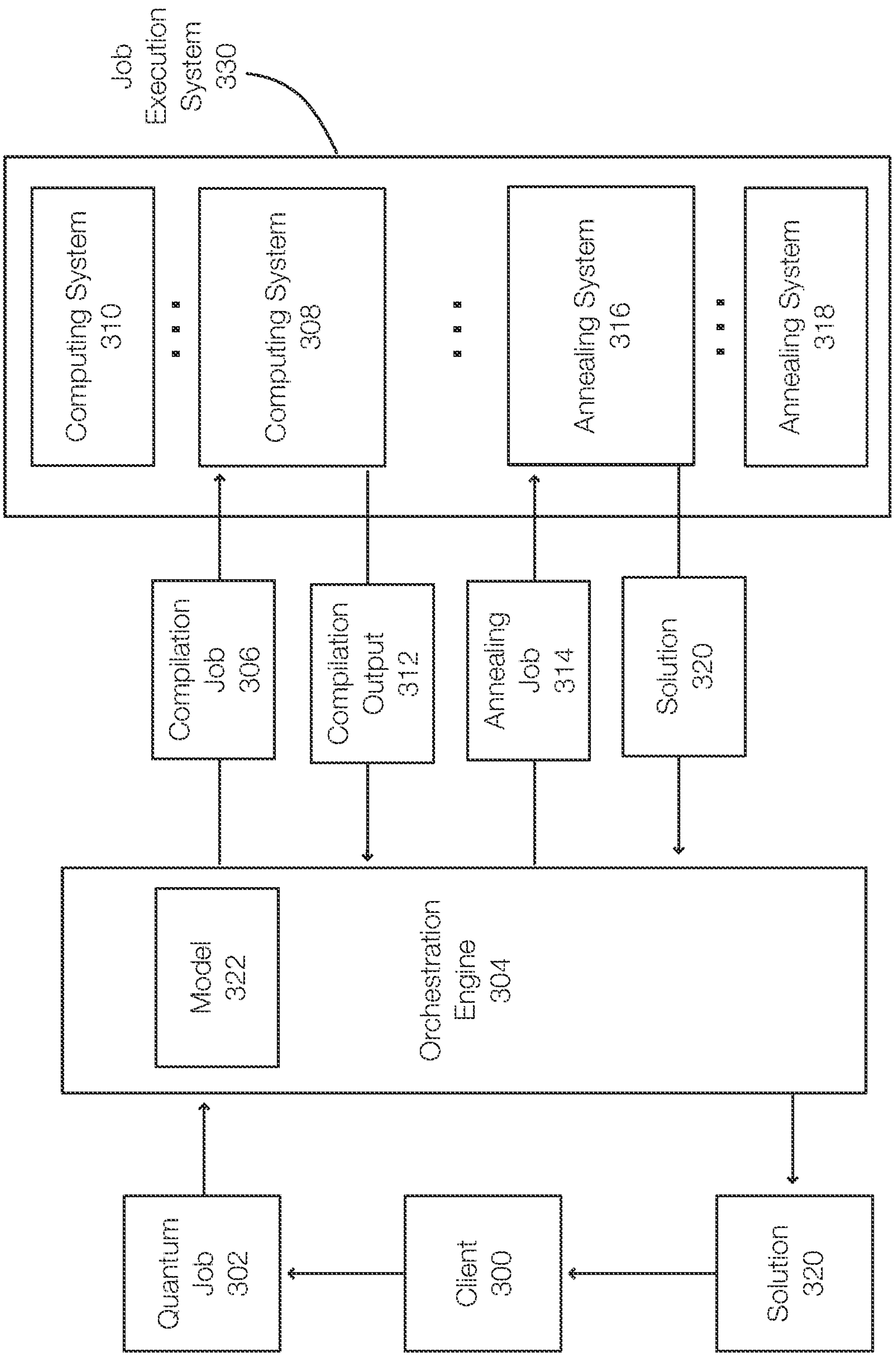
FIG. 3 discloses aspects of orchestrating a quantum job in a job execution system.

FIG. 3 discloses additional aspects of performing quantum jobs, which may include distributing or placing compilation jobs and annealing jobs. In FIG. 3, the job execution system 330 includes computing systems represented by computing systems 308 and 310 and quantum systems represented by annealing systems 316 and 318.

In this example, a quantum job 302 from a client 300 is received at an orchestration engine 304. Using, by way of example, a model 322 that has been trained using historical data describing historical quantum jobs, the orchestration engine 304 may estimate or predict a complication time, required resources, execution time, or other aspects of the quantum jobs that can be learned from the historical data. For example, the model 322 may be trained to predict execution times for compilation jobs on different types of hardware, different amounts of resources, or the like.

When a quantum job is received, the orchestration engine 304 may identify or separate out the compilation job. The orchestration engine 304 used the model 322 to predict or estimate compilation time. In another example, the compilation job is identified by instrumentation of the quantum job where markers indicate each phase of the job (i.e., the creation of $H_i$ matrices). The compilation job 306 identified by the orchestration engine 304 is placed in a computing system 308 in the job execution system 330.

The computing system 308 compiles the compilation job 306 and generates a compilation output 312, such as a file or a Hamiltonian $H_{final}$. The compilation output 312 is an example of an annealing job 314 that is then placed by the orchestration engine with an annealing system 316. The annealing system 316 executes the annealing job 314 and returns a solution 320. The solution 320, received by the orchestration engine 304, may be provided to the client 300 that submitted the quantum job 302.

When the orchestration engine 304 receives a quantum job, the orchestration engine 314, may perform various operations. These operations may be based on the compilation job and the annealing job. For example, if the annealing system 316 is determined to be the best execution environment for both the compilation job 306 and the annealing job 314, both are sent to the annealing system 316.

In the annealing system 316 is occupied or if other resources can perform or execute the compilation job 306 more quickly or more efficiently, the orchestration engine 304 may place the compilation job 306 at a different system, such as the computing system 308. The placement of the compilation job may be based on resources required, resources/hardware available, and/or service level objectives. The annealing job may be kept in the quantum job queue.

The orchestration engine 304 may be configured to monitor the execution of compilation jobs in the job execution system 330. When a compilation job is completed, the orchestration engine 304 may store a pointer to the output files containing every $H_i$ that was generated. The orchestration engine 304 next determines whether an annealing system is available. If an annealing system, such as the annealing system 316 is available, the outputs of the associated compilations are moved to that annealing system. The annealing system 316 sums all portions of Hamiltonians $H_i$ and places the execution (the annealing job 314) on the annealing system 316.

More generally, when a quantum job 302 is received into the quantum job queue of the orchestration engine 304, the orchestration engine 304 may determine the cost of performing the quantum job 302. This may include a sum of classical computation (compilation job) plus quantum computation (annealing job). This may be measured in terms of time and/or resource requirements (e.g., processing power, memory, qubits). If necessary, the compilation job is separated from the annealing job and the various jobs are placed on the infrastructure as resources in the job execution system 330 become available.

Embodiments of the invention are thus configured to separate a quantum job into a compilation job and an annealing job. This allows resources to be allocated to perform the compilation jobs and the annealing jobs based on available resources and/or service level objectives. In addition, the computing system selected for a compilation job can be performed based on the resources, type of resources (e.g., CPU/GPU model, memory), or the like.

Figure 4:
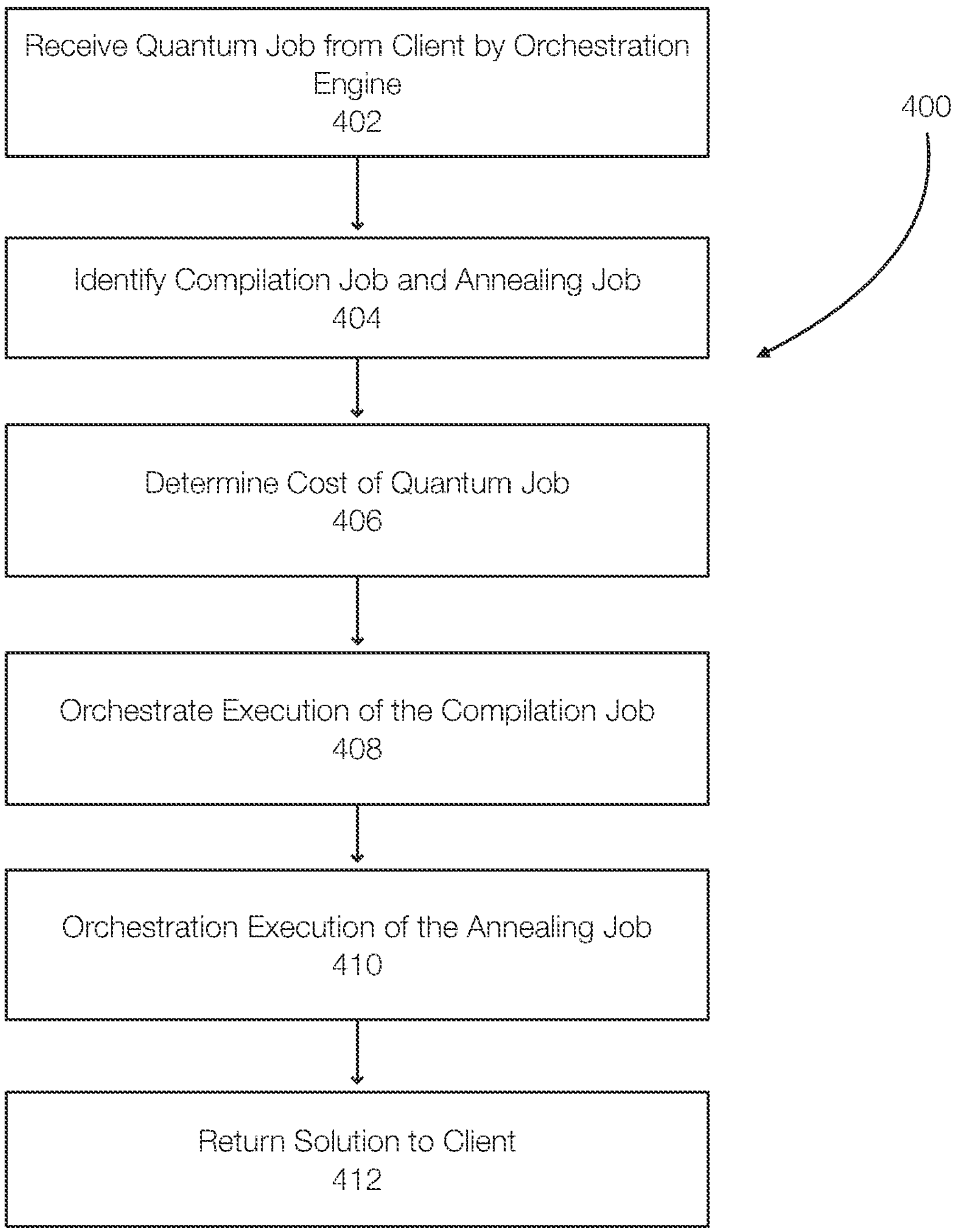
FIG. 4 discloses aspects of a method for dynamically orchestrating aspects of a quantum job including compilation and/or execution.

FIG. 4 discloses aspects of orchestrating quantum jobs. The method 400 includes receiving 402 a quantum job at an orchestration engine from a client (e.g., a user or a user's device). The orchestration engine then evaluates the quantum job and identifies 404 the associated compilation job and annealing job.

The cost of the quantum job is also determined 406. The total cost of computation is a sum of the classical computational environment used for QUBO compilation and quantum environment for QUBO execution. Next, the compilation job is orchestrated 408. This allows the compilation job to be sent to a node or classical computing system based on resources available at the classical computing system and/or service level objectives associated with the quantum job. Once the compilation job is completed, the annealing job is orchestrated 410. The solution is returned 412 to the client.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations which may include, but are not limited to, quantum job operations, quantum job orchestration operations, minor embedding operations, prediction operations, feasibility operations, compilation operations, QUBO execution related operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data functionality. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients or nodes that are capable of collecting, modifying, and creating, data. As such, a particular client or node may employ, or otherwise be associated with, one or more instances of each of one or more applications that perform such operations with respect to data. Such clients or nodes may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: identifying, by an orchestration engine, a compilation job and an annealing job associated with a quantum job, determining a cost of performing the quantum job that includes a first cost of the compilation job and a second cost of the annealing job, orchestrating execution of the compilation job in a job execution system based on available resources in the job execution system and service level objectives associated with the quantum job in view of the first cost and the second cost, orchestrating execution of the annealing job in the job execution system based on the available resources and the service level objectives, and returning a solution of the quantum job.

Embodiment 2. The method of embodiment 1, further comprising receiving the quantum job at the orchestration engine.

Embodiment 3. The method of embodiment 1 and/or 2, further comprising determining the first cost using a machine learning model that is trained using costs of historical compilation jobs.

Embodiment 4. The method of embodiment 1, 2, and/or 3, further comprising placing the compilation job at a classical computing system that is selected based on resource availability and/or service level objectives associated with the quantum job, and compiling the compilation job at the selected classical computing system.

Embodiment 5. The method of embodiment 1, 2, 3, and/or 4, further comprising generating a compilation output, wherein the compilation output comprises the annealing job, wherein the annealing job includes a QUBO configured as input for execution in a quantum annealer.

Embodiment 6. The method of embodiment 1, 2, 3, 4, and/or 5, further comprising placing the annealing job at the quantum annealer based on resource availability and/or service level objectives.

Embodiment 7. The method of embodiment 1, 2, 3, 4, 5, and/or 6, wherein the compilation job and the annealing job are placed at the same system that is configured to perform both the compilation job and the annealing job.

Embodiment 8. The method of embodiment 1, 2, 3, 4, 5, 6, and/or 7, further comprising separating the compilation job and the annealing job that are in the quantum job.

Embodiment 9. The method of embodiment 1, 2, 3, 4, 5, 6, 7, and/or 8, further comprising providing the orchestration engine with a pointer to a file that constitutes a compiler output, wherein the compiler output includes multiple Hamiltonians.

Embodiment 10. The method of embodiment 1, 2, 3, 4, 5, 6, 7, 8, and/or 9, wherein the first cost is based on a penalization of constraints that includes part of the quantum job.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
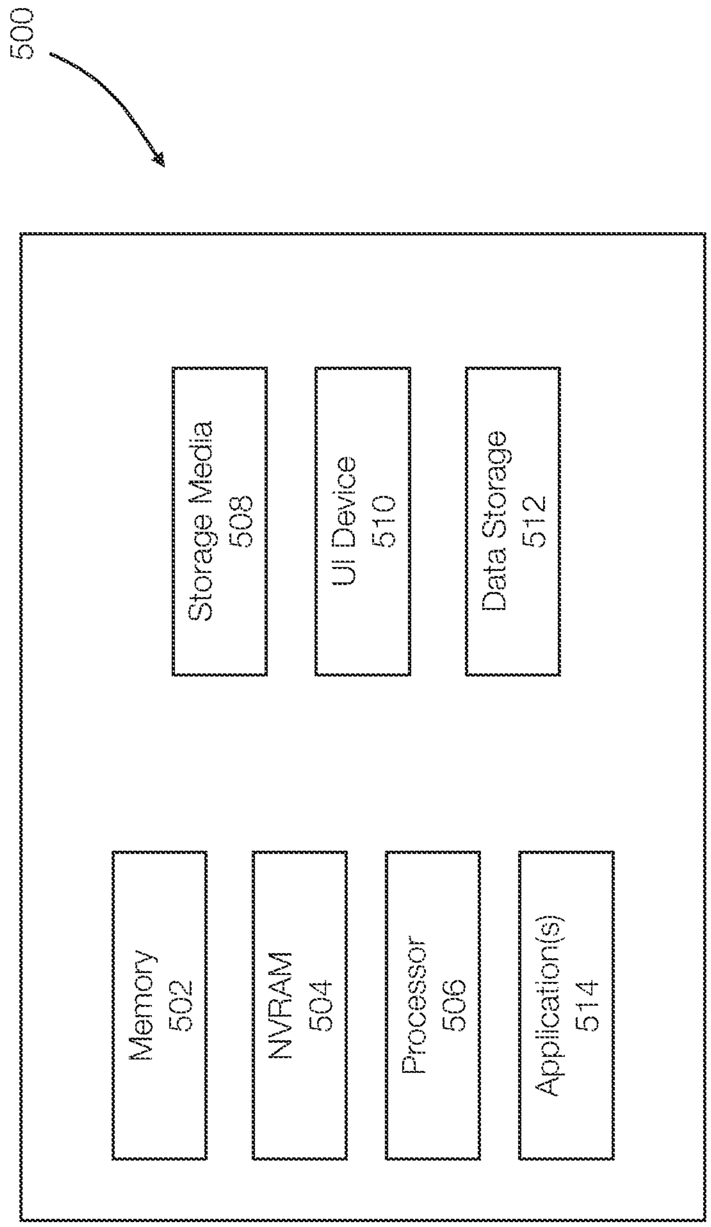
FIG. 5 discloses aspects of a classical computing system.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 5 includes a memory 5 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 500 is representative of classical computing systems, nodes, servers, clusters, virtual computers, or the like or combination thereof. The device 500 may also implement a virtual quantum system in a classical system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

identifying, by an orchestration engine, a compilation job and an annealing job associated with a quantum job, wherein the compilation job comprises a quadratic unconstrained binary optimization (QUBO) formulation, wherein the identifying is to distribute the compilation job and the annealing job to efficiently use computing resources;

determining a cost of performing the quantum job that includes a first cost of the compilation job and a second cost of the annealing job, wherein the first cost is based on the QUBO formulation including dualization of a constraint with a penalty, and the second cost is based on execution of the QUBO formulation on a quantum annealer, wherein the quantum annealer is a type of a quantum computing system;

orchestrating execution, on a selected classical computing system, of the compilation job in a job execution system by compiling the QUBO formulation to form a Hamiltonian based on available resources in the job execution system and service level objectives associated with the quantum job in view of the first cost and the second cost;

orchestrating execution of the annealing job by annealing the compiled QUBO formulation, by the quantum annealer in the job execution systems based on the available resources and the service level objectives;

and returning a solution of the quantum job based an output from the quantum annealer.

2. The method of claim 1, further comprising receiving the quantum job at the orchestration engine.

3. The method of claim 1, further comprising determining the first cost using a machine learning model that is trained using costs of historical compilation jobs.

4. The method of claim 1, further comprising: placing the compilation job at the selected classical computing system; and compiling the compilation job at the selected classical computing system.

5. The method of claim 4, further comprising generating a compilation output, wherein the compilation output comprises the annealing job, wherein the annealing job includes the compiled QUBO formulation configured as input for execution in the quantum annealer.

6. The method of claim 5, further comprising placing the annealing job at the quantum annealer based on resource availability and/or service level objectives.

7. The method of claim 6, wherein the compilation job and the annealing job are placed at a same system that is configured to perform both the compilation job and the annealing job.

8. The method of claim 1, further comprising separating the compilation job and the annealing job that are in the quantum job.

9. The method of claim 1, further comprising providing the orchestration engine with a pointer to a file that constitutes a compiler output, wherein the compiler output includes multiple Hamiltonians.

10. The method of claim 1, wherein the first cost is based on a penalization of constraints that includes part of the quantum job.

11. A non-transitory storage medium having stored therein instructions that are executable by one or more hardware processors to perform operations comprising:

identifying, by an orchestration engine, a compilation job and an annealing job associated with a quantum job, wherein the compilation job comprises a quadratic unconstrained binary optimization (QUBO) formulation, wherein the identifying is to distribute the compilation job and the annealing job to efficiently use computing resources;

determining a cost of performing the quantum job that includes a first cost of the compilation job and a second cost of the annealing job, wherein the first cost is based on the QUBO formulation including dualization of a constraint with a penalty, and the second cost is based on execution of the QUBO formulation on a quantum annealer, wherein the quantum annealer is a type of a quantum computing system;

orchestrating execution, on a selected classical computing system, of the compilation job in a job execution system by compiling the QUBO formulation to form a Hamiltonian based on available resources in the job execution system and service level objectives associated with the quantum job in view of the first cost and the second cost;

orchestrating execution of the annealing job by annealing the compiled QUBO formulation, by the quantum annealer in the job execution system based on the available resources and the service level objectives;

and returning a solution of the quantum job based an output from the quantum annealer.

12. The non-transitory storage medium of claim 11, wherein the operations further comprise receiving the quantum job at the orchestration engine.

13. The non-transitory storage medium of claim 11, wherein the operations further comprise determining the first cost using a machine learning model that is trained using costs of historical compilation jobs.

14. The non-transitory storage medium of claim 11, wherein the operations further comprise: placing the compilation job at the selected classical computing system; and compiling the compilation job at the selected classical computing system.

15. The non-transitory storage medium of claim 14, wherein the operations further comprise generating a compilation output, and wherein the compilation output comprises the annealing job, wherein the annealing job includes the compiled QUBO formulation configured as input for execution in the quantum annealer.

16. The non-transitory storage medium of claim 15, wherein the operations further comprise placing the annealing job at the quantum annealer based on resource availability and/or service level objectives.

17. The non-transitory storage medium of claim 16, wherein the compilation job and the annealing job are placed at a same system that is configured to perform both the compilation job and the annealing job.

18. The non-transitory storage medium of claim 11, wherein the operations further comprise separating the compilation job and the annealing job that are in the quantum job.

19. The non-transitory storage medium of claim 11, wherein the operations further comprise providing the orchestration engine with a pointer to a file that constitutes a compiler output, and wherein the compiler output includes multiple Hamiltonians.

20. The non-transitory storage medium of claim 11, wherein the first cost is based on a penalization of constraints that includes part of the quantum job.

* * * * *